US012665374B2

(12) United States Patent
Hirosawa et al.

(10) Patent No.: US 12,665,374 B2
(45) Date of Patent: Jun. 23, 2026

(54) PLANAR WAVEGUIDE AMPLIFIER AND LASER RADAR DEVICE

(71) Applicant: Mitsubishi Electric Corporation, Tokyo (JP)

(72) Inventors: Kenichi Hirosawa, Tokyo (JP); Narito Samejima, Tokyo (JP); Kenichi Uto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1064 days.

(21) Appl. No.: 17/825,850

(22) Filed: May 26, 2022

(65) Prior Publication Data

US 2022/0294170 A1      Sep. 15, 2022

Related U.S. Application Data

(63) Continuation of application No. PCT/JP2019/049545, filed on Dec. 18, 2019.

(51) Int. Cl.
*H01S 3/067* (2006.01)
*G01S 7/481* (2006.01)
(Continued)

(52) U.S. Cl.
CPC ........ *H01S 3/06733* (2013.01); *G01S 7/4818* (2013.01); *H01S 3/0405* (2013.01); *H01S 3/094015* (2013.01)

(58) Field of Classification Search
None
See application file for complete search history.

(56) References Cited

U.S. PATENT DOCUMENTS 7,440,180 B2 * 10/2008 Tang ..................... H01S 3/0632
359/347
2001/0009458 A1    7/2001 Asaka et al.
(Continued)

FOREIGN PATENT DOCUMENTS

JP        2001-201573 A      7/2001
JP        2003-152252 A      5/2003
(Continued)

OTHER PUBLICATIONS

Extended European Search Report dated Oct. 20, 2022 for Application No. 19956930.2.
(Continued)

*Primary Examiner* — Eric L Bolda
(74) *Attorney, Agent, or Firm* — Birch, Stewart, Kolasch & Birch, LLP

(57) ABSTRACT

A planar waveguide amplifier includes a planar waveguide including a flat plate-like core; a first cladding provided on a first principal face of the core; and a second cladding provided on a second principal face of the core, and signal light and pumping light travel into the planar waveguide so that the signal light and the pumping light propagate inside the core in such a manner that optical paths of the signal light and the pumping light overlap each other, and in a zig-zag manner, and the core is an amplification medium containing a rare-earth element serving as an active ion of a three-level system, and absorbs the signal light on the basis of a reduction in intensity of the pumping light.

18 Claims, 5 Drawing Sheets

(51) Int. Cl.
    *H01S 3/04*          (2006.01)
    *H01S 3/094*         (2006.01)

(56)                References Cited

U.S. PATENT DOCUMENTS

| 2002/0131746 A1* | 9/2002 | Bayramian | ........... H01S 3/0632 |
| | | | 385/27 |
| 2004/0176236 A1 | 9/2004 | Hayden et al. | |
| 2007/0110116 A1* | 5/2007 | Vetrovec | ................. H01S 3/042 |
| | | | 372/66 |
| 2014/0268309 A1* | 9/2014 | Strohkendl | ........... H01S 3/2308 |
| | | | 359/341.1 |

FOREIGN PATENT DOCUMENTS

| JP | 2012-160645 A | 8/2012 |
| WO | WO 2011/027471 A1 | 3/2011 |
| WO | WO 2018/087845 A1 | 5/2018 |

OTHER PUBLICATIONS

International Search Report for PCT/JP2019/049545 mailed on Mar. 17, 2020.
Japanese Notice of Reasons for Refusal, issued in JP Patent Application No. 2020-526159 dated Jun. 30, 2020.
Mackenzie, "Dielectric Solid-State Planar Waveguide Lasers: a Review", IEEE Journal of Selected Topics in Quantum Electronics, vol. 13, No. 3, May/Jun. 2007, pp. 626-637.
Written Opinion of the International Searching Authority for PCT/JP2019/049545 mailed on Mar. 17, 2020.

* cited by examiner

PLANAR WAVEGUIDE AMPLIFIER AND LASER RADAR DEVICE

CROSS REFERENCE TO RELATED APPLICATION

This application is a Continuation of PCT International Application No. PCT/JP2019/049545, filed on Dec. 18, 2019, which is hereby expressly incorporated by reference into the present application.

TECHNICAL FIELD

The present disclosure relates to a planar waveguide amplifier and a laser radar device including the planar waveguide amplifier.

BACKGROUND ART

A planar waveguide amplifier is an optical amplifier that amplifies light transmitted to an optical waveguide in flat plate-like shape (hereinafter, referred to as "planar wave-guide"). For example, Patent Literature 1 describes an optical amplifier in which signal light propagates through a planar waveguide while being reflected inside the planar waveguide a plurality of times. In the optical amplifier described in Patent Literature 1, a core in the planar wave-guide is excited by pumping light, and signal light propagates through the core while being reflected inside the excited core a plurality of times. As a result, the signal light is amplified.

In addition, in the optical amplifier described in Patent Literature 1, the pumping light excites the entire core in the planar waveguide, and a portion inside the core through which the signal light does not pass is also excited. Since the portion inside the core through which the signal light does not pass does not contribute to amplification of the signal light, the efficiency of converting energy of the pumping light to energy that can be used to amplify the signal light decreases.

For example, the optical waveguide has a core extending in a direction in which signal light transmits, and in a portion inside the core through which the signal light does not pass, energy of pumping light is stored in the core and thus the portion is in a state of having gain. On the other hand, in a portion inside the optical waveguide through which the signal light passes, since the energy stored in the core is used to amplify the signal light, the relative gain between the portion through which the signal light passes and the portion through which the signal light does not pass decreases.

The portion inside the optical waveguide through which the signal light does not pass is in a state of having gain as described above. Hence, if spontaneous emission which is spontaneously emitted from the entire core or scattered light which is a part of the signal light scattered is amplified in the portion inside the optical waveguide through which the signal light does not pass, then amplified spontaneous emis- sion (hereinafter, referred to as "ASE") occurs or parasitic oscillation occurs. ASE and parasitic oscillation both are factors that limit output of the amplifier. In a case where the planar waveguide amplifier is used in a laser radar device, the presence of intense ASE is a factor that deteriorates the signal-to-noise ratio (hereinafter, referred to as "S/N ratio") of the laser radar device.

CITATION LIST

Patent Literatures

Patent Literature 1: JP 2012-160645 A

SUMMARY OF INVENTION

Technical Problem

In the conventional optical amplifier, a portion inside the optical waveguide through which signal light does not pass is also excited by pumping light, thereby generating ASE, and thus, there is a problem that in a case where the conventional optical amplifier is used in a laser radar device, the S/N ratio decreases.

The present disclosure is made to solve the above-de-scribed problem, and an object of the present disclosure is to obtain a planar waveguide amplifier that can suppress occur-rence of ASE, and a laser radar device including the planar waveguide amplifier.

Solution to Problem

A planar waveguide amplifier according to the present disclosure includes a planar waveguide including: a flat plate-like core to amplify signal light, with the core excited by pumping light; a first cladding to reflect light having propagated from the core back to the core, the first cladding being provided on a first principal face of the core; and a second cladding to reflect light having propagated from the core back to the core, the second cladding being provided on a second principal face of the core on an opposite side to the first principal face, and the signal light and the pumping light travel into the planar waveguide so that the signal light and the pumping light propagate inside the core in such a manner that optical paths of the signal light and the pumping light overlap each other, in directions opposite to each other, and in a zig-zag manner, and so that a portion through which the signal light and the pumping light do not pass is formed inside the core, and the core is an amplification medium that contains a rare-earth element serving as an active ion of a three-level system, and absorbs scattered light of the signal light and amplified spontaneous emission in a portion through which the pumping light does not pass.

Advantageous Effects of Invention

According to the present disclosure, a planar waveguide is provided that includes a flat plate-like core; first cladding provided on a first principal face of the core; and second cladding provided on a second principal face of the core, and signal light and pumping light travel into the planar wave-guide so that the signal light and the pumping light propa-gate inside the core in such a manner that optical paths thereof overlap each other, and in a zig-zag manner, and the core is an amplification medium containing a rare-earth element serving as an active ion of a three-level system, and absorbs the signal light on the basis of a reduction in the intensity of the pumping light. Thus, a portion of the planar waveguide through which the signal light does not pass is difficult to be excited, and in a portion of the planar waveguide with low intensity of the pumping light, scattered light of the signal light is absorbed by the core, and thus, the planar waveguide amplifier according to the present disclo-sure can suppress occurrence of ASE.

DESCRIPTION OF EMBODIMENTS

First Embodiment

In an embodiment described below, a flat plate-like optical waveguide is a transmission line which is made of a material having optical characteristics (hereinafter, referred to as "optical material"), and through which light propagates. In addition, the optical waveguide not only allows light to propagate therethrough, but also has incorporated therein an electrical element required for light propagation and a structure for branching or coupling optical paths. In the following description, the term "structure" of the optical waveguide is used as a concept including not only a mechanical structure such as the dimensions of the optical waveguide, but also an optical material to be used and characteristics of the optical material. In addition, the term "flat plate-like shape" also includes a sheet-like shape.

Figure 1:
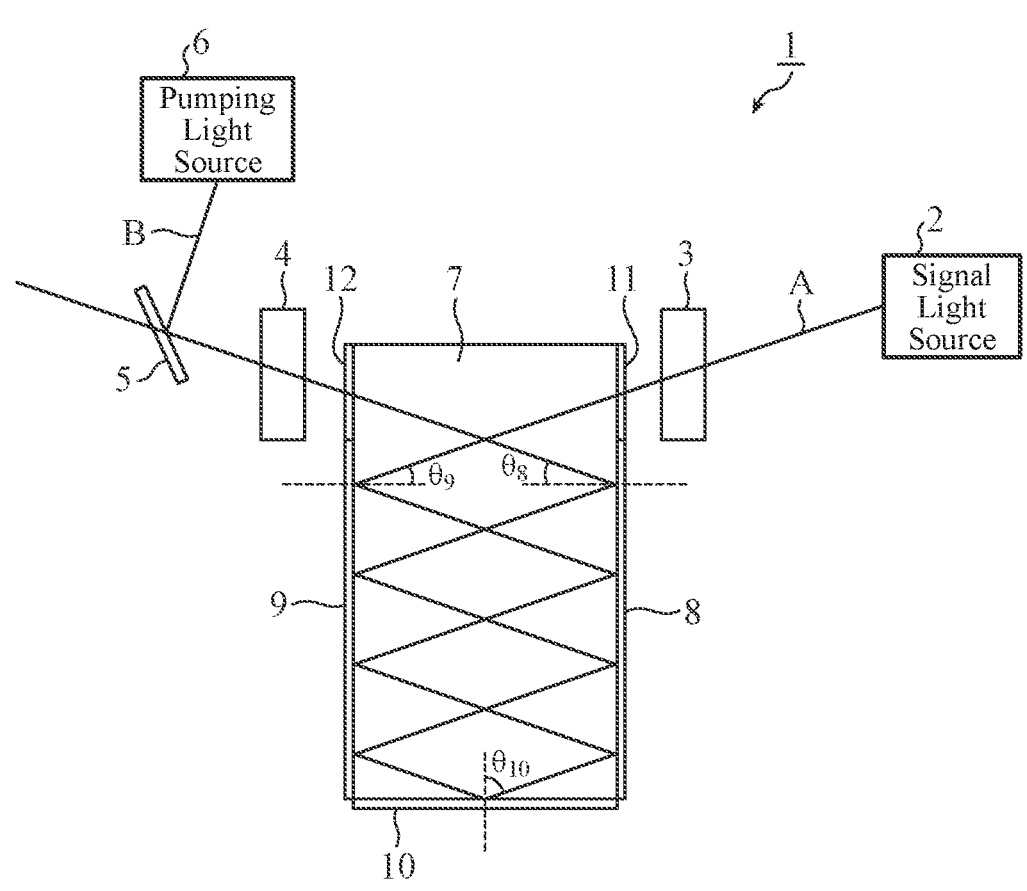
FIG. 1 is a block diagram showing a configuration of a planar waveguide amplifier according to a first embodiment.

FIG. 1 is a block diagram showing a configuration of a planar waveguide amplifier 1 according to a first embodiment. The planar waveguide amplifier 1 is an amplifier that amplifies signal light A and includes, as shown in FIG. 1, a signal light source 2, an input optics 3, an output optics 4, a wavelength filter 5, a pumping light source 6, and a planar waveguide 7. The signal light source 2 is a light source from which the signal light A is emitted. The pumping light source 6 is a light source from which pumping light B is emitted. The planar waveguide 7 includes a high reflection film 8, a high reflection film 9, a high reflection film 10, an antireflection film 11, and an antireflection film 12.

The input optics 3 is an optical system that couples the signal light A having propagated from the signal light source 2 to the planar waveguide 7. In addition, in order to prevent reflected light or ASE having propagated from the planar waveguide 7 from entering the signal light source 2, the input optics 3 changes an optical path of the reflected light or ASE. For the input optics 3, for example, a cylindrical lens and an isolator are used, and the signal light A is allowed to travel into the planar waveguide 7 by the cylindrical lens, and the pumping light B traveling toward the signal light source 2 is isolated by the isolator.

As shown in FIG. 1, the high reflection film 8 and the high reflection film 9 are arranged on the planar waveguide 7 so as to face each other, and the high reflection film 10 is disposed at a switching location at which an outward path and a return path for light are switched inside the planar waveguide 7. The antireflection film 11 is disposed at a portion of the planar waveguide 7 into which the signal light A travels, and the antireflection film 12 is disposed at a portion of the planar waveguide 7 into which the pumping light B travels.

The signal light A having been emitted from the signal light source 2 is guided to the planar waveguide 7 by the input optics 3, passes through the antireflection film 11, and travels into the planar waveguide 7. The signal light A propagates inside the planar waveguide 7 along a zig-zag optical path in the opposite direction to the pumping light B while being reflected off each of the high reflection film 8, the high reflection film 9, and the high reflection film 10. The signal light A travels on the high reflection film 9 at an incident angle $\theta_9$, travels on the high reflection film 8 at an incident angle $\theta_8$, and travels on the high reflection film 10 at an incident angle $\theta_{10}$. By the signal light A being reflected off the high reflection film 10, an outward path and a return path are switched, by which the signal light A propagates toward an exit side.

The output optics 4 is an optical system that couples the pumping light B having propagated from the pumping light source 6 to the planar waveguide 7. For example, the output optics 4 includes a cylindrical lens that collimates light having been emitted from the pumping light source 6. The wavelength filter 5 allows the signal light A to pass therethrough and reflects the pumping light B, thereby separating a wavelength of the signal light A and a wavelength of the pumping light B. The signal light A having exited from the planar waveguide 7 passes through the wavelength filter 5 and is taken out.

The pumping light B having been emitted from the pumping light source 6 is guided to the planar waveguide 7 by the wavelength filter 5, passes through the antireflection film 12, and travels into the planar waveguide 7. The pumping light B propagates inside the planar waveguide 7 along a zig-zag optical path in the opposite direction to the signal light A while being reflected off each of the high reflection film 8, the high reflection film 9, and the high reflection film 10. Note that the pumping light B travels on the high reflection film 8 at an incident angle $\theta_8$, travels on the high reflection film 9 at an incident angle $\theta_9$, and travels on the high reflection film 10 at an incident angle $\theta_{10}$. By the pumping light B being reflected off the high reflection film 10, an outward path and a return path are switched, by which the pumping light B propagates toward an exit side.

Propagation optical paths of the signal light A and the pumping light B overlap each other inside the planar waveguide 7. A state in which the propagation optical path of the signal light A overlaps the propagation optical path of the pumping light B includes, for example, not only a state in which optical axes of the optical paths match each other, but also a state in which the optical axes are slightly shifted from each other. For example, when it is assumed that the signal light A and the pumping light B are present at the same location on their propagation optical paths, it is allowable that a beam cross-section of the signal light A and a beam cross-section of the pumping light B at this location overlap each other so as to include their optical axes.

Since the propagation optical path of the signal light A and the propagation optical path of the pumping light B overlap each other, a portion inside the planar waveguide 7 through which the signal light A does not pass is difficult to be excited. Thus, spontaneous emission or scattered light which is a part of the signal light A scattered is difficult to be amplified in the portion through which the signal light A does not pass. Hence, in the planar waveguide amplifier 1, occurrence of ASE is suppressed and energy of the pumping light B can be efficiently used to amplify the signal light A.

Note that the high reflection film 8, the high reflection film 9, and the high reflection film 10 are reflection films that reflect both the signal light A and the pumping light B. The reflection films that reflect both the signal light A and the pumping light B are simple in structure and easy to form compared to a wavelength separating film that reflects the signal light A and allows the pumping light B to pass therethrough, and thus can achieve cost reduction and are also excellent in reliability of reflection characteristics.

Figure 2:
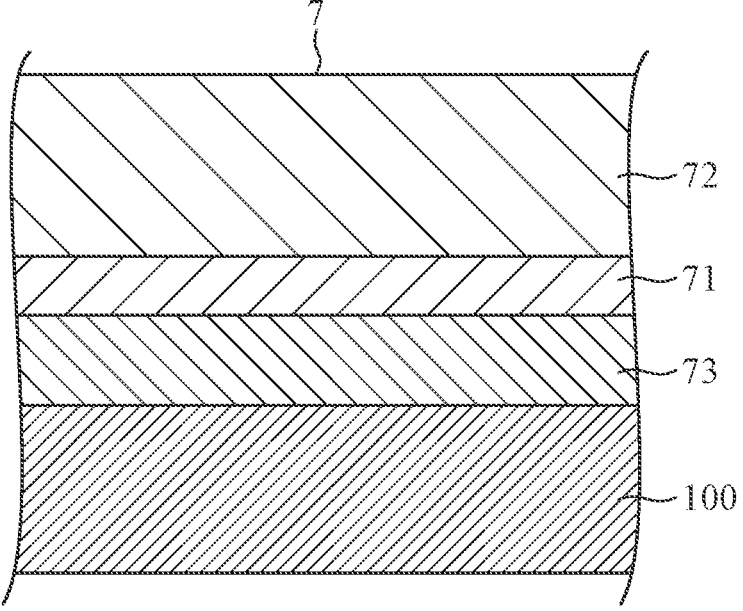
FIG. 2 is a cross-sectional view showing a configuration of a planar waveguide included in the planar waveguide amplifier according to the first embodiment.

FIG. 2 is a cross-sectional view showing a configuration of the planar waveguide 7 included in the planar waveguide amplifier 1. As shown in FIG. 2, the planar waveguide 7 includes a core 71, a first cladding 72, a second cladding 73, and a heat sink 100. The core 71 is a flat plate-like core that is excited by the pumping light B, thereby amplifying the signal light A.

The first cladding 72 is provided so as to be joined to a first principal face of the core 71, and reflects light having propagated through the core 71 back to the inside of the core 71. The second cladding 73 is provided so as to be joined to a second principal face of the core 71 on the opposite side to the first principal face, and reflects light having propagated through the core 71 back to the inside of the core 71.

In a case where the refractive index $n_{71}$ of the core 71 and the angle $\theta_8$ of light with respect to the high reflection film 8 satisfy a high reflection condition shown in the following expression (1), the planar waveguide 7 does not need to include the high reflection film 8. In addition, in a case where the refractive index $n_{71}$ of the core 71 and the angle $\theta_9$ of light with respect to the high reflection film 9 satisfy the high reflection condition shown in the following expression (1), the planar waveguide 7 does not need to include the high reflection film 9. In a case where the refractive index $n_{71}$ of the core 71 and the angle $\theta_{10}$ of light with respect to the high reflection film 10 satisfy the high reflection condition shown in the following expression (1), the planar waveguide 7 does not need to include the high reflection film 10. Note that in the following expression (1), the refractive index of air is 1 (the value of a numerator on the right side of the following expression (1)).

$$\sin \theta \geq 1/n_{71} \qquad (1)$$

In a case where the core 71 satisfies the high reflection condition for light, a process of providing a high reflection film on the planar waveguide 7 is omitted. In the planar waveguide 7 whose core 71 satisfies the high reflection condition for light, instead of providing a high reflection film, a protective coating can be applied to its face. For example, phosphate glass has a drawback that it has hygroscopicity, but has a feature that characteristics thereof are less likely to deteriorate even if rare-earth elements such as Er, Yb, Tm, Nd, and Ho are doped thereinto at a high concentration. Hence, by using phosphate glass having a high concentration of rare-earth elements doped thereinto as the core 71, the planar waveguide amplifier 1 can obtain a high amplification factor. However, since phosphate glass has hygroscopicity, if the phosphate glass is exposed to atmosphere, then optical characteristics thereof deteriorate. Since the first cladding 72 and the second cladding 73 are joined to two wide principal faces of the core 71, it is effective to apply a protective coating to sides to prevent exposure to atmosphere. For a coating material of the protective coating, a Sift thin film, etc., can be used.

For the core 71, for example, glass doped with rare-earth elements such as Er, Yb, Tm, Nd, and Ho, a crystal doped with rare earth such as $Nd:YVO_4$, ceramic that uses a crystalline material doped with rare earth elements such as Yb:YAG as a raw material, or a crystal doped with transition metals such as Cr:YAG or Ti:Sapphire is used. The core 71 including any of those optical materials is a gain generating member that creates a population inversion by absorbing the pumping light B and generates gain by a radiative transition.

The core 71 doped with rare-earth elements such as Er, Yb, and Tm is a so-called amplification medium of a three-level system. These rare-earth elements are transformed into active ions of a three-level system when excited. The active ions of a three-level system are active ions that transition to three energy levels in amplification of the signal light A. In the core 71 doped with such rare-earth elements, if the pumping light B with intensity sufficient to amplify the signal light A is absorbed, then the signal light A is amplified, and if the intensity of the pumping light B is lower than that of the signal light A or if the pumping light B is not present, then the signal light A is absorbed. Hereinafter, it is assumed that the core 71 is glass codoped with Er and Yb.

The first cladding 72 and the second cladding 73 are flat plate-like transparent optical materials for the signal light A having been emitted from the signal light source 2 and the pumping light B having been emitted from the pumping light source 6. The first cladding 72 and the second cladding 73 may use, for example, optical glass as their materials. For the first cladding 72 and the second cladding 73, normally, the same optical material is used. Note that for the first cladding 72 and the second cladding 73, different optical materials can be used.

For the first cladding 72 and the second cladding 73, an optical material with a lower refractive index than that of the core 71 is used. As a result, the signal light A is totally reflected at an interface between the core 71 and the first cladding 72 and is totally reflected at an interface between the core 71 and the second cladding 73, by which the signal light A propagates with the signal light A trapped inside the core 71.

At least either one of the first cladding 72 and the second cladding 73 is made of an optical material with a refractive index close to that of the core 71. Single-mode or few-mode signal light A propagates through the core 71. For example, in a case where the refractive index $n_{71}$ of the core 71 is 1.530, the refractive index of the first cladding 72 and the refractive index of the second cladding 73 both are 1.527, and the thickness of the core 71 is 7 μm, light with a wavelength of 1.55 μm (1550 nm) propagates in single mode.

In the planar waveguide 7 in which the refractive indices of the core 71, first cladding 72, and second cladding 73 have the above-described values, normally, single-mode or few-mode pumping light B propagates. In this case, for the pumping light source 6, a light source with excellent beam quality such as a single-mode light source is required. A high-power single-mode light source is normally expensive. Note that in a case where the core 71 is made of glass codoped with Er and Yb, as the pumping light source 6, for example, a Yb-doped fiber laser can be used. The Yb-doped fiber laser is a laser in which Yb is doped into a core of an optical fiber, and is a relatively inexpensive, high-power single-mode light source.

Light with a wavelength at which the core 71 has a gain is emitted as the signal light A from the signal light source 2. In addition, the signal light source 2 includes a laser light source, a modulator, a preamplifier, and an isolator, description of which is omitted in FIG. 1. In a case where at least either one of the first cladding 72 and the second cladding 73 is made of a material having a refractive index close to the refractive index of the core 71, as the signal light source 2, a light source with excellent beam quality is used, from which single-mode light or light close to a single mode is emitted.

In the core 71, by absorbing the pumping light B, energy for amplifying the signal light A is accumulated. Furthermore, the core 71 is configured not to amplify but to absorb the signal light A on the basis of a reduction in the intensity of the pumping light B. Note that in order to prevent the intensity of the pumping light B from becoming lower than the intensity of the signal light A during a period from when the pumping light B travels into the core 71 until the pumping light B exits, the propagation length of light and the absorption rate of the pumping light B per unit length in the planar waveguide 7 are adjusted.

In the core 71 made of glass codoped with Er and Yb, Yb (ytterbium) mainly absorbs the pumping light B and Er (erbium) mainly amplifies the signal light A. In the planar waveguide 7, for example, by changing the concentration of Yb contained in the core 71, the absorption rate of the pumping light B per unit length in the core 71 is adjusted.

In addition, the absorption rate of the pumping light B per unit length in the core 71 varies depending on the wavelength of the pumping light B. For example, by selecting the pumping light source 6 from which pumping light B with a target wavelength is emitted, the absorption rate of the pumping light B per unit length in the core 71 is adjusted. Note that in the planar waveguide amplifier 1, a combination of a material of the core 71 and the pumping light source 6 is not limited to that described above.

For example, in the planar waveguide amplifier 1 in which the core 71 contains Er, light with a wavelength of 1550 nm may be used as the signal light A, and light with a wavelength of 1480 nm may be used as the pumping light B. In this case, a dielectric multilayer film that separates or couples together two pieces of light with different wavelengths may be formed on the planar waveguide 7.

However, the dielectric multilayer film that separates two pieces of light with close wavelengths such as a wavelength of 1550 nm and a wavelength of 1480 nm has a large number of films and is likely to increase film stress. Hence, in the planar waveguide 7 having the dielectric multilayer film formed thereon, deformation or cracking caused by film stress is likely to occur.

Since the planar waveguide amplifier 1 includes the wavelength filter 5 separately from the planar waveguide 7, the planar waveguide 7 requires the high reflection film 8, the high reflection film 9, and the high reflection film 10 that reflect both the signal light A and the pumping light B. The high reflection film 8, the high reflection film 9, and the high reflection film 10 can be more easily formed as the wavelengths of the signal light A and the pumping light B get closer to each other, and a reduction in efficiency caused by quantum defect can also be suppressed.

The first cladding 72 and the second cladding 73 may be made of a material having a different refractive index than that of the core 71. In this case, since both the signal light A and the pumping light B propagate in multi-mode inside the core 71, the planar waveguide 7 functions as a multi-mode waveguide.

For example, in a case where the core 71 has a refractive index of 1.530 and a thickness of 20 μm and the first cladding 72 and the second cladding 73 both have a refractive index of 1.47, light with a wavelength of 1.55 μm (1550 nm) propagates in multi-mode. Thus, as the pumping light source 6, a multi-mode light source can be used. For example, a laser diode is a multi-mode light source and can be used as the pumping light source 6.

In a case where the intensity of light propagating through the planar waveguide 7 is high, the core 71 generates heat, resulting in a high temperature. To emit the heat generated in the core 71, as shown in FIG. 2, the heat sink 100 is joined to the second cladding 73 of the planar waveguide 7. In a case where the heat-flow density of the planar waveguide 7 is j and the thermal conductivity is λ, a change in the temperature T of the planar waveguide 7 can be represented by the following expression (2):

$$j = -\lambda \mathrm{grad}T \tag{2}$$

Since the temperature is considered to be uniform in a light propagation direction in the planar waveguide 7, in a case where a coordinate in a thickness direction of the planar waveguide 7 is a z-axis coordinate in the above-described expression (2), heat-flow density $j_z$ in a z-axis direction can be represented by the following expression (3):

$$j_z = -\lambda(dT/dz) \tag{3}$$

For example, in a case where the thermal conductivity of the second cladding 73 is about 1 and the thickness of the second cladding 73 is 30 μm, the heat-flow density of the second cladding 73 required so that the temperature difference between the second principal face of the core 71 and a face on the opposite side to the second principal face is 1 degree is $3.33 \times 10^{-2}$ W/mm$^2$. This indicates that when it is assumed that the temperature of the heat sink 100 is constant and the area of the planar waveguide 7 is 1000 mm$^2$, the temperature increases by 1 degree in a case where an amount of heat of 33.3 W is generated in the core 71. Since a principal face having the largest area in the core 71 faces the heat sink 100 with the second cladding 73 therebetween, heat generated in the core 71 is efficiently emitted by the heat sink 100. As a result, an increase in the temperature of the planar waveguide 7 is suppressed.

Note that the heat sink 100 may be provided on a face of the first cladding 72 on the opposite side to the core 71 or may be provided on both of the face of the first cladding 72 on the opposite side to the core 71 and a face of the second cladding 73 on the opposite side to the core 71. In the planar waveguide 7 thus configured, too, heat generated in the core 71 is efficiently emitted by the heat sink 100. As a result, an increase in the temperature of the planar waveguide 7 is suppressed.

The signal light A having traveled into the planar waveguide 7 is totally reflected at interfaces between the core 71 and the first cladding 72 and the second cladding 73 in a direction perpendicular to paper in FIG. 2, by which the signal light A is trapped inside the planar waveguide 7. In addition, the signal light A freely propagates as collimated light in a direction horizontal to the paper in FIG. 2. Thus, the signal light A in the planar waveguide 7 has a large beam area compared to light that propagates through a general optical fiber, and a nonlinear phenomenon which is a factor that limits power of light in an optical fiber is suppressed. Namely, the planar waveguide 7 can amplify the signal light A to obtain higher peak power than peak power that can be achieved by an optical fiber.

The amplification factor per unit length of the core 71 for the signal light A is determined by the stimulated emission cross section and minimum inversion factor of a material used for the core 71 and the concentration of rare-earth ions. The concentration of rare-earth ions contributes to the inversion factor and amplification. The inversion factor of the core 71 increases on the basis of the photon density (luminance) of the pumping light B. Note that the inversion factor of the core 71 has an upper limit and is 1 at maximum.

When the inversion factor of the core 71 increases, depending on the type and concentration of rare-earth ions, a reduction in amplification efficiency by up-conversion occurs. In addition, the stimulated emission cross section and minimum inversion factor are determined by the type of rare-earth ions and the wavelength of the signal light A. Thus, there is an upper limit to the amplification factor per unit length for the signal light A. In the planar waveguide amplifier 1, in order to increase the amplification factor for the signal light A, the signal light A propagates over a long distance inside the core 71.

In the planar waveguide amplifier 1, the signal light A and the pumping light B propagate inside the core 71 in such a manner that optical paths thereof overlap each other, and in a zig-zag manner in opposite directions to each other. The signal light A propagates along a zig-zag optical path and thus propagates over a long distance inside the core 71. Since the optical path of the pumping light B overlaps the optical path of the signal light A, as with the signal light A, the pumping light B propagates over a long distance inside the core 71. Thus, the amplification factor of the core 71 for the signal light A improves.

In addition, since the pumping light B with intensity sufficient to amplify the signal light A is absorbed in an optical path of the pumping light B from entry to exit from the core 71, the signal light A is efficiently amplified. A portion of the core 71 through which the signal light A does not pass is also a portion through which the pumping light B does not pass, and thus, the portion through which signal light A does not pass is difficult to be excited by the pumping light B. As a result, occurrence of spontaneous emission is suppressed, thereby suppressing occurrence of ASE caused by spontaneous emission.

In the core 71, rare-earth elements serving as active ions of a three-level system absorb the signal light A in a portion through which the pumping light B does not pass, scattered light of the signal light A, and ASE. As a result, occurrence of ASE is suppressed, and thus, energy of the pumping light B can be efficiently used to amplify the signal light A, and a reduction in the amplification factor of the core 71 for the signal light A can be suppressed.

In addition, in the core 71, since the rare-earth elements serving as active ions of a three-level system absorb parasitic oscillation light in a portion through which the pumping light B does not pass, parasitic oscillation is suppressed. Thus, even if an optical path in the planar waveguide 7 has a layout that likely causes parasitic oscillation, parasitic oscillation is suppressed. As a result, flexibility in the layout of an optical path in the planar waveguide 7 improves.

As shown in FIG. 1, both sides of the planar waveguide 7 are parallel to each other, and the high reflection film 8 is provided on one of both sides and the high reflection film 9 is provided on the other side. If the entire core 71 that is an element of the planar waveguide 7 is excited, then undesired light travels back and forth between the high reflection film 8 and the high reflection film 9 and is amplified, by which parasitic oscillation occurs. In the planar waveguide amplifier 1, the signal light A propagates inside the core 71 so as to follow an optical path of the pumping light B. As a result, the core 71 absorbs undesired light having propagated through a portion through which the pumping light B does not pass, thereby suppressing parasitic oscillation.

For example, a laser radar device can measure a target with high resolution, but the S/N ratio is greatly influenced by ASE. As described above, the planar waveguide amplifier 1 suppresses occurrence of ASE and thus can improve the S/N ratio of the laser radar device.

Figure 3:
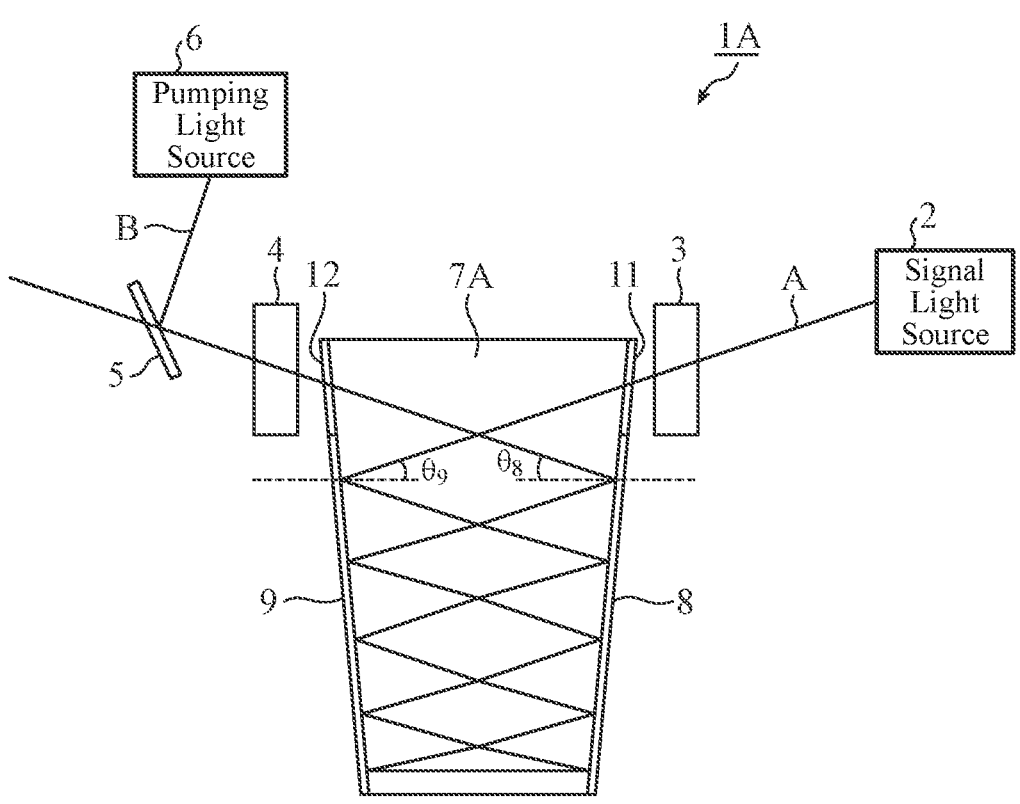
FIG. 3 is a block diagram showing a configuration of a first variant of the planar waveguide amplifier according to the first embodiment.

FIG. 3 is a block diagram showing a configuration of a planar waveguide amplifier 1A which is a first variant of the planar waveguide amplifier 1. The planar waveguide amplifier 1A is an amplifier that amplifies signal light A and includes, as shown in FIG. 3, the signal light source 2, the input optics 3, the output optics 4, the wavelength filter 5, the pumping light source 6, and a planar waveguide 7A. Note that in FIG. 3, the same components as those of FIG. 1 are given the same reference signs and description thereof is omitted.

The planar waveguide 7A includes the core 71, the first cladding 72, and the second cladding 73 which are shown in FIG. 2 and has, as shown in FIG. 3, a flat plate-like shape whose width gradually decreases. The high reflection film 8 is provided on one of both sides of the planar waveguide 7A and the high reflection film 9 is provided on the other side. The signal light A is allowed to travel into the planar waveguide 7A by the input optics 3 so that the signal light A propagates inside the core 71 in such a manner that an optical path thereof overlaps an optical path of pumping light B, and in a zig-zag manner in the opposite direction to the pumping light B.

The signal light A travels on the high reflection film 9 at an incident angle $\theta_9$ through the antireflection film 11, travels on the high reflection film 8 at an incident angle $\theta_8$, and propagates inside the planar waveguide 7A while being reflected between the high reflection film 8 and the high reflection film 9 a plurality of times. Since the planar waveguide 7A has a flat plate-like shape whose width gradually decreases, an outward path of the signal light A is switched to a return path in reflection between the high reflection film 8 and the high reflection film 9, and the signal light A exits from the planar waveguide 7A. The signal light A having exited from the planar waveguide 7A is outputted to the wavelength filter 5 through the output optics 4 and taken out by the wavelength filter 5.

The pumping light B is allowed to travel into the planar waveguide 7A by the input optics 4 so that the pumping light B propagates inside the core 71 in such a manner that an optical path thereof overlaps an optical path of the signal light A, and in a zig-zag manner in the opposite direction to the signal light A. The pumping light B travels on the high reflection film 8 at an incident angle $\theta_8$ through the antireflection film 12, travels on the high reflection film 9 at an incident angle $\theta_9$, and propagates inside the planar waveguide 7A while being reflected between the high reflection film 8 and the high reflection film 9 a plurality of times. An outward path of the pumping light B is switched to a return path in reflection between the high reflection film 8 and the high reflection film 9, and the pumping light B exits from the planar waveguide 7A. Thus, the planar waveguide 7A does not require the high reflection film 10.

Figure 4:
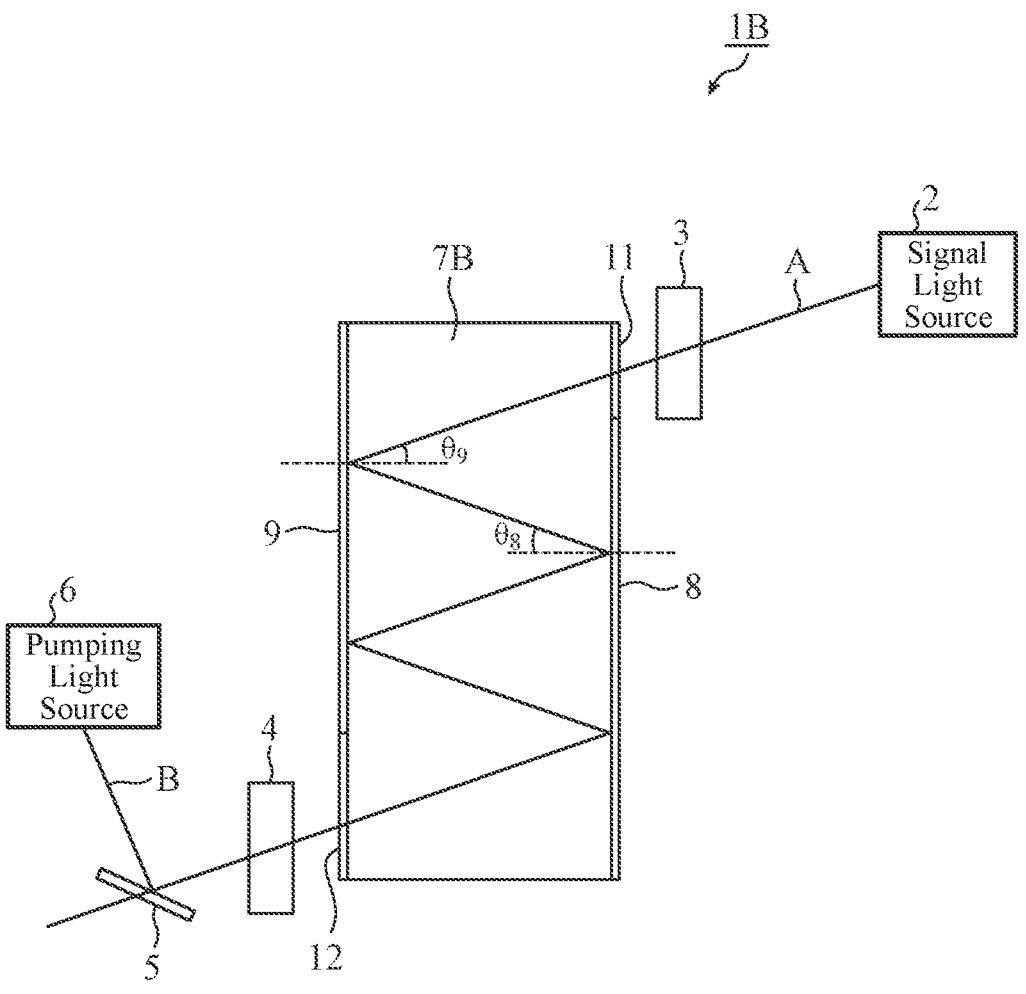
FIG. 4 is a block diagram showing a configuration of a second variant of the planar waveguide amplifier according to the first embodiment.

FIG. 4 is a block diagram showing a configuration of a planar waveguide amplifier 1B which is a second variant of the planar waveguide amplifier 1. The planar waveguide amplifier 1B is an amplifier that amplifies signal light A and includes, as shown in FIG. 4, the signal light source 2, the input optics 3, the output optics 4, the wavelength filter 5, the pumping light source 6, and a planar waveguide 7B. Note that in FIG. 4, the same components as those of FIG. 1 are given the same reference signs and description thereof is omitted.

The planar waveguide 7B includes the core 71, the first cladding 72, and the second cladding 73 which are shown in FIG. 2 and has, as shown in FIG. 4, a flat plate-like shape with a constant width. The high reflection film 8 is provided on one of both sides of the planar waveguide 7B and the high reflection film 9 is provided on the other side. The signal light A is allowed to travel into the planar waveguide 7B by the input optics 3 so that the signal light A propagates inside the core 71 in such a manner that an optical path thereof overlaps an optical path of pumping light B, and in a zig-zag manner in the opposite direction to the pumping light B.

In the planar waveguide 7B, the antireflection film 11 does not face the antireflection film 12, and the antireflection film 11 is provided at a first end portion in a longitudinal direction of the planar waveguide 7B and the antireflection film 12 is provided at a second end portion in the longitudinal direction of the planar waveguide 7B which is on the opposite side to the first end portion. The signal light A travels on the high reflection film 9 at an incident angle $\theta_9$ through the antireflection film 11, travels on the high reflection film 8 at an incident angle $\theta_8$, and propagates inside the planar waveguide 7B while being reflected between the high reflection film 8 and the high reflection film 9 a plurality of times.

The signal light A exits from the planar waveguide 7B through the antireflection film 12 provided at the second end portion of the planar waveguide 7B. The signal light A having exited from the planar waveguide 7B is outputted to the wavelength filter 5 through the output optics 4 and taken out by the wavelength filter 5.

The pumping light B is allowed to travel into the planar waveguide 7B by the input optics 4 so that the pumping light B propagates inside the core 71 in such a manner that an optical path thereof overlaps an optical path of the signal light A, and in a zig-zag manner in the opposite direction to the signal light A. The pumping light B travels on the high reflection film 8 at an incident angle $\theta_8$ through the antireflection film 12, travels on the high reflection film 9 at an incident angle $\theta_9$, and propagates inside the planar waveguide 7B while being reflected between the high reflection film 8 and the high reflection film 9 a plurality of times. The pumping light B exits from the planar waveguide 7B through the antireflection film 11 provided at the first end portion of the planar waveguide 7B. Thus, the planar waveguide 7B does not require the high reflection film 10.

Figure 5:
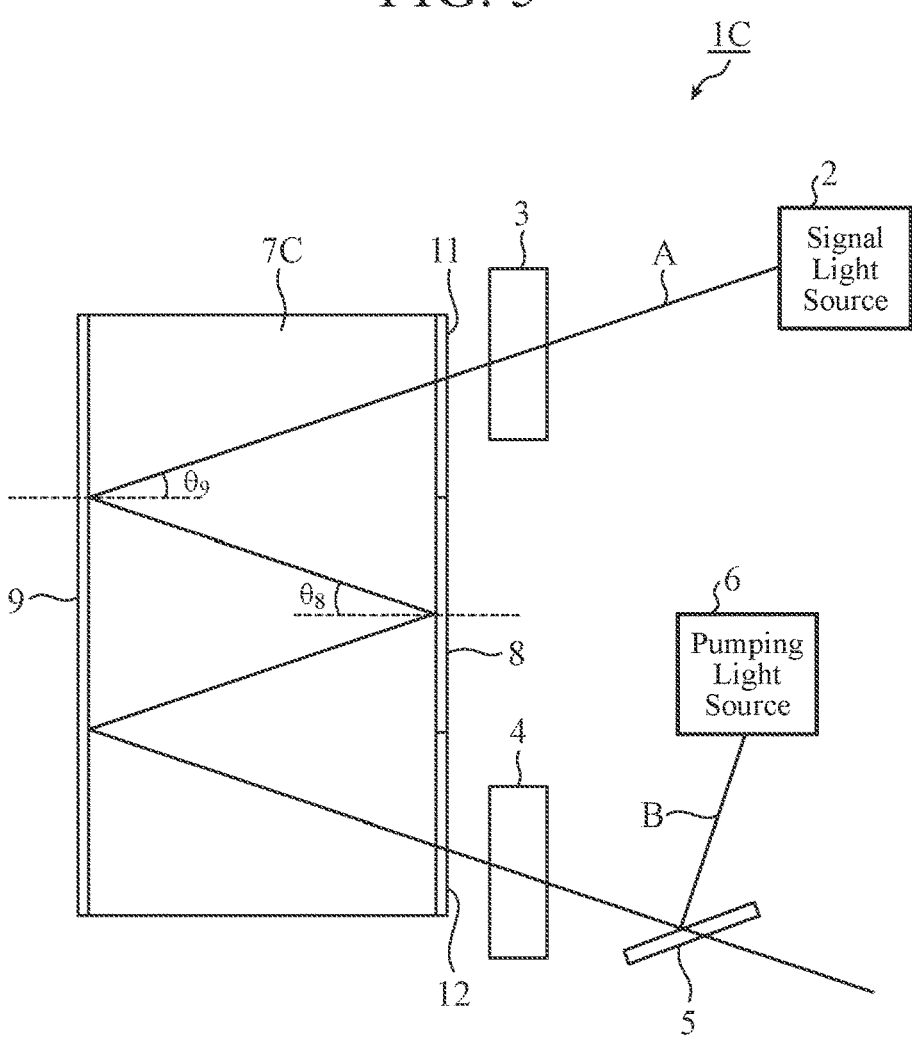
FIG. 5 is a block diagram showing a configuration of a third variant of the planar waveguide amplifier according to the first embodiment.

FIG. 5 is a block diagram showing a configuration of a planar waveguide amplifier 1C which is a third variant of the planar waveguide amplifier 1. The planar waveguide amplifier 1C is an amplifier that amplifies signal light A and includes, as shown in FIG. 5, the signal light source 2, the input optics 3, the output optics 4, the wavelength filter 5, the pumping light source 6, and a planar waveguide 7C. Note that in FIG. 5, the same components as those of FIG. 1 are given the same reference signs and description thereof is omitted.

The planar waveguide 7C includes the core 71, the first cladding 72, and the second cladding 73 which are shown in FIG. 2 and has, as shown in FIG. 5, a flat plate-like shape with a constant width. The high reflection film 8 is provided on one of both sides of the planar waveguide 7C and the high reflection film 9 is provided on the other side. The signal light A is allowed to travel into the planar waveguide 7C by the input optics 3 so that the signal light A propagates inside the core 71 in such a manner that an optical path thereof overlaps an optical path of pumping light B, and in a zig-zag manner in the opposite direction to the pumping light B.

In the planar waveguide 7C, the antireflection film 11 and the antireflection film 12 are provided on an antireflection film 11 side so as to be side by side in a longitudinal direction of the planar waveguide 7C. The signal light A travels on the high reflection film 9 at an incident angle $\theta_9$ through the antireflection film 11, travels on the high reflection film 8 at an incident angle $\theta_8$, and propagates inside the planar waveguide 7C while being reflected between the high reflection film 8 and the high reflection film 9 a plurality of times. The signal light A exits from the planar waveguide 7C through the antireflection film 12. The signal light A having exited from the planar waveguide 7C is outputted to the wavelength filter 5 through the output optics 4 and taken out by the wavelength filter 5.

The pumping light B is allowed to travel into the planar waveguide 7C by the input optics 4 so that the pumping light B propagates inside the core 71 in such a manner that an optical path thereof overlaps an optical path of the signal light A, and in a zig-zag manner in the opposite direction to the signal light A. The pumping light B travels on the high reflection film 8 at an incident angle $\theta_8$ through the antireflection film 12, travels on the high reflection film 9 at an incident angle $\theta_9$, and propagates inside the planar waveguide 7C while being reflected between the high reflection film 8 and the high reflection film 9 a plurality of times. The pumping light B exits from the planar waveguide 7C through the antireflection film 11. Thus, the planar waveguide 7C does not require the high reflection film 10.

Figure 6:
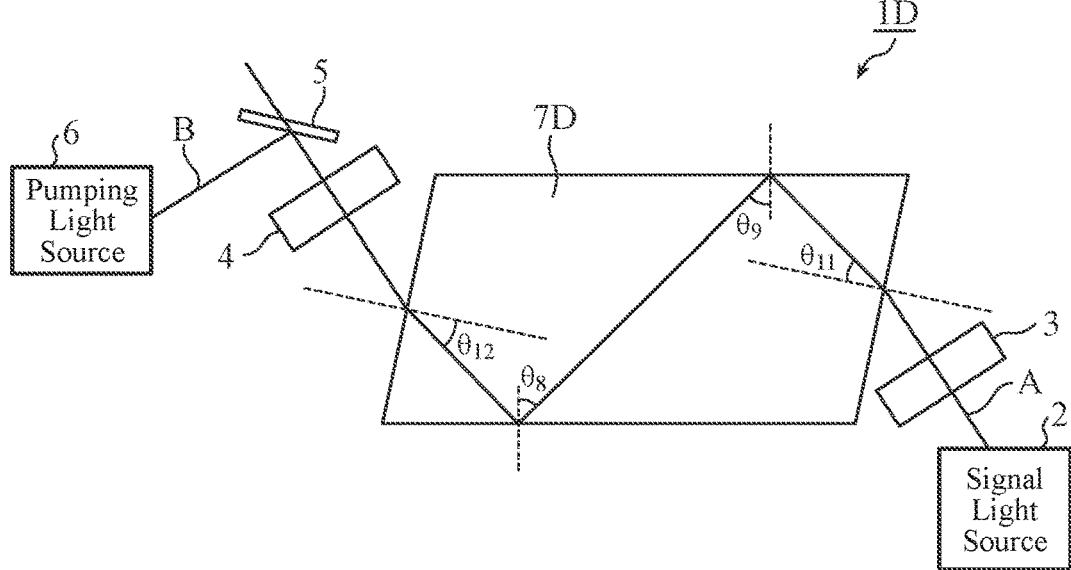
FIG. 6 is a block diagram showing a configuration of a fourth variant of the planar waveguide amplifier according to the first embodiment.

FIG. 6 is a block diagram showing a configuration of a planar waveguide amplifier 1D which is a fourth variant of the planar waveguide amplifier 1. The planar waveguide amplifier 1D is an amplifier that amplifies signal light A and includes, as shown in FIG. 6, the signal light source 2, the input optics 3, the output optics 4, the wavelength filter 5, the pumping light source 6, and a planar waveguide 7D. Note that in FIG. 6, the same components as those of FIG. 1 are given the same reference signs and description thereof is omitted.

The planar waveguide 7D includes the core 71, the first cladding 72, and the second cladding 73 which are shown in FIG. 2, but does not include, as shown in FIG. 6, the high reflection film 8, the high reflection film 9, the high reflection film 10, the antireflection film 11, and the antireflection film 12. In the planar waveguide 7D, light having traveled at an angle that satisfies a certain condition is reflected inside the planar waveguide 7D a plurality of times and then exits. The certain condition is that the angle is less than the Brewster's angle $\theta_B$ inside the planar waveguide 7D.

For example, in a case where the refractive index of air is 1, the Brewster's angle $\theta_B$ inside the planar waveguide 7D is represented by the following expression (4). In a case where the refractive index of the core 71 is 1.530, the Brewster's angle $\theta_B$ is 58.8°.

$$\theta_B = \mathrm{Arctan}(n_{71}) \qquad (4)$$

In a case where the angles $\theta_{11}$ and $\theta_{12}$ are set to 56.8°, in the planar waveguide 7D, polarized signal light A in a direction horizontal to paper in FIG. 6 can reduce loss caused by Fresnel reflection, without providing antireflection films. Likewise, by setting the angles $\theta_8$ and $\theta_9$ to 45.0°, the high reflection condition is satisfied and the signal light A and pumping light B are reflected inside the core 71 a plurality of times.

The signal light A is allowed to travel into the planar waveguide 7D by the input optics 3 so that the signal light A propagates inside the core 71 in such a manner that an optical path thereof overlaps an optical path of the pumping light B, and in a zig-zag manner in the opposite direction to the pumping light B. The signal light A travels on an incident surface of the planar waveguide 7D at an incident angle $\theta_{11}$, travels on an inside surface of the planar waveguide 7D at an incident angle $\theta_9$, travels to another inside surface at an incident angle $\theta_8$, travels to the other surface at an incident angle $\theta_{12}$, and then exits from the planar waveguide 7D. The signal light A having exited from the planar waveguide 7D is outputted to the wavelength filter 5 through the output optics 4 and taken out by the wavelength filter 5.

The pumping light B is allowed to travel into the planar waveguide 7D by the wavelength filter 5 and the output optics 4 so that the pumping light B propagates inside the core 71 in such a manner that an optical path thereof overlaps an optical path of the signal light A, and in a zig-zag manner in the opposite direction to the signal light A. The pumping light B travels on an incident surface of the planar waveguide 7D at an incident angle $\theta_{12}$, travels on an inside surface of the planar waveguide 7D at an incident angle $\theta_8$, travels to another surface at an incident angle $\theta_9$, travels to the other surface at an incident angle $\theta_{11}$, and then exits from the planar waveguide 7D. Thus, the planar waveguide 7D does not require the high reflection film 8, the high reflection film 9, the high reflection film 10, the antireflection film 11, and the antireflection film 12.

In the planar waveguide amplifiers 1 and 1A to 1D shown in FIGS. 1 and 3 to 6, the output optics 4 and the wavelength filter 5 are arranged on a rear stage side on which the signal light A exits from the planar waveguides 7 and 7A to 7D. The signal light A and the pumping light B propagate in opposite directions to each other inside the planar waveguides 7 and 7A to 7D. Inside the planar waveguides 7 and 7A to 7D, the signal light A is amplified but the pumping light B is absorbed.

Since the signal light A and the pumping light B propagate in opposite directions to each other inside the planar waveguides 7 and 7A to 7D, a portion of the planar waveguides 7 and 7A to 7D with low intensity of the signal light A is in a state in which the intensity of the pumping light B is also low, and a portion of the planar waveguides 7 and 7A to 7D in which the signal light A is amplified and thus has high intensity is in a state in which the intensity of the pumping light B is also high. Since the signal light A exits with the signal light A amplified through an end portion of the planar waveguides 7 and 7A to 7D into which the pumping light B travels, both the intensity of the signal light A and the intensity of the pumping light B are high at the end portion into which the pumping light B travels. Thus, gain saturation is less likely to occur and a high amplification factor can be expected. This is a specific advantageous effect that cannot be obtained when signal light and pumping light propagate in the same direction in a planar waveguide.

In the planar waveguide amplifiers 1 and 1A to 1D shown in FIGS. 1 and 3 to 6, the output optics 4 and the wavelength filter 5 may be arranged on a front stage side on which the signal light A travels. In this configuration, the signal light A and the pumping light B propagate in a forward direction inside the planar waveguides 7 and 7A to 7D. In this case, as described above, since the signal light A and the pumping light B respectively have maximum outputs at different surfaces, the chance of damage on the surface of the planar waveguides 7 and 7A to 7D is reduced.

As described above, the planar waveguide amplifiers 1 and 1A to 1D according to the first embodiment include the planar waveguides 7 and 7A to 7D each including the flat plate-like core 71, the first cladding 72 provided on the first principal face of the core 71, and the second cladding 73 provided on the second principal face of the core 71, and signal light A and pumping light B travel into the planar waveguides 7 and 7A to 7D so that the signal light A and the pumping light B propagate inside the core 71 in such a manner that optical paths thereof overlap each other, and in a zig-zag manner, and the core 71 is an amplification medium containing rare-earth elements serving as active ions of a three-level system, and absorbs the signal light A on the basis of a reduction in the intensity of the pumping light B. Thus, a portion of the planar waveguides 7 and 7A to 7D through which the signal light A does not pass is difficult to be excited, and scattered light of the signal light A is absorbed by the core 71 in a portion of the planar waveguides 7 and 7A to 7D with low intensity of the pumping light B, and thus, the planar waveguide amplifiers 1 and 1A to 1D according to the first embodiment can suppress occurrence of ASE. Since the signal light A is not amplified but is absorbed in a portion of the core 71 through which the signal light A does not pass, parasitic oscillation and ASE are suppressed. In addition, the planar waveguides 7 and 7A to 7D are optical waveguides that do not require a special structure for suppressing parasitic oscillation and ASE and have a high degree of flexibility in optical path design. Since the signal light A propagates over a long distance inside the planar waveguides 7 and 7A to 7D, a high amplification factor can be achieved.

In the planar waveguide amplifiers 1 and 1A to 1D according to the first embodiment, the planar waveguides 7 and 7A to 7D each include the high reflection film 8 and the high reflection film 9 or the high reflection film 10 that reflect both the signal light A and the pumping light B. The signal light A and the pumping light B having traveled into the planar waveguides 7 and 7A to 7D exit from the planar waveguides 7 and 7A to 7D by reflection at the high reflection film 8 and the high reflection film 9 or the high reflection film 10. The reflection films that reflect both the signal light A and the pumping light B are simple in structure and easy to form compared to a wavelength separating film that reflects the signal light A and allows the pumping light B to pass therethrough, and thus can achieve cost reduction and are also excellent in reliability of reflection characteristics.

The planar waveguide amplifiers 1 and 1A to 1D according to the first embodiment each include the heat sink 100 that is provided on at least one of a face of the first cladding 72 on the opposite side to the core 71 and a face of the second cladding 73 on the opposite side to the core 71 and that emits heat generated in the core 71. Since the heat in the core 71 is emitted through the heat sink 100, an increase in the temperature of the planar waveguides 7 and 7A to 7D can be suppressed.

Second Embodiment

Figure 7:
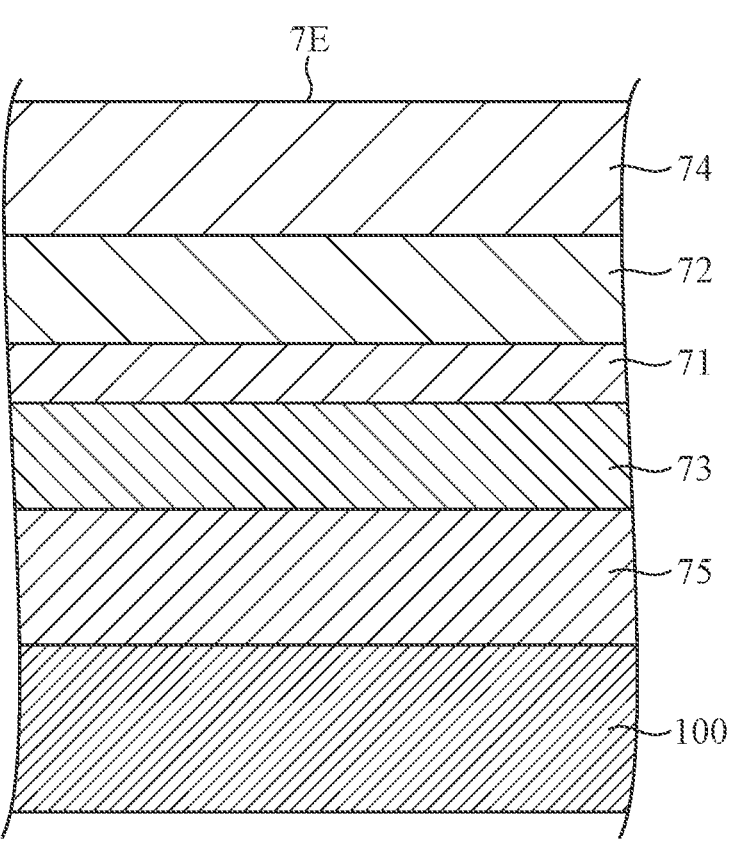
FIG. 7 is a cross-sectional view showing a configuration of a planar waveguide included in a planar waveguide amplifier according to a second embodiment.

FIG. 7 is a cross-sectional view showing a configuration of a planar waveguide 7E included in a planar waveguide amplifier according to a second embodiment. The planar waveguide amplifier according to the second embodiment includes the planar waveguide 7E instead of the planar waveguide shown in each of FIGS. 1 and 3 to 6. The planar waveguide 7E includes a core 71, a first cladding 72, a second cladding 73, a first external cladding 74, a second external cladding 75, and a heat sink 100.

The first external cladding 74 is provided on a face of the first cladding 72 on the opposite side to the core 71, and reflects pumping light B having propagated from the core 71 through the first cladding 72 back to the inside of the core 71. The second external cladding 75 is provided on a face of the second cladding 73 on the opposite side to the core 71, and reflects pumping light B having propagated from the core 71 through the second cladding 73 back to the inside of the core 71. The first external cladding 74 and the second external cladding 75 are flat plates of a transparent material for the pumping light B, and optical glass can be used. The first external cladding 74 and the second external cladding 75 may be made of the same material or may be made of different materials.

The first external cladding 74 is made of a material with a lower refractive index than that of the first cladding 72, and the second external cladding 75 is made of a material with a lower refractive index than that of the second cladding 73. In the planar waveguide 7E, the pumping light B propagating through the core 71 is reflected off the first cladding 72 back to the inside of the core 71. A part of the pumping light B passes through the first cladding 72 without being reflected off the first cladding 72. The pumping light B having leaked into the first cladding 72 is reflected toward the core 71 by the first external cladding 74.

Likewise, pumping light B propagating through the core 71 is reflected off the second cladding 73 back to the inside of the core 71. A part of the pumping light B passes through the second cladding 73 without being reflected off the second cladding 73. The pumping light B having leaked into the second cladding 73 is reflected toward the core 71 by the second external cladding 75. In this manner, the pumping light B propagates with the pumping light B trapped inside the core 71.

The first external cladding 74 and the second external cladding 75 both are made of a material with a lower refractive index than that of the first cladding 72 and the second cladding 73. Hence, unlike signal light A that propagates through the core 71, the pumping light B propagates in multi-mode inside the planar waveguide 7E. Namely, as the pumping light source 6, a multi-mode light source can be used. For example, as the pumping light source 6, a laser diode is used.

The planar waveguide 7E may not include either one of the first external cladding 74 and the second external cladding 75. In addition, the planar waveguide 7E may not include either one of the first cladding 72 and the second cladding 73. For example, in a case where the planar waveguide 7E does not include the first cladding 72, it is configured that the first external cladding 74 is directly joined to the core 71. In addition, in a case where the planar waveguide 7E does not include the second cladding 73, it is configured that the second external cladding 75 is directly joined to the core 71.

As shown in FIG. 7, the heat sink 100 is joined to a face of the second external cladding 75 on the opposite side to the second cladding 73. Heat generated in the planar waveguide 7E is emitted by the heat sink 100. In the planar waveguide 7E, since a principal face having the largest area in the core 71 faces the heat sink 100 with the second cladding 73 and the second external cladding 75 therebetween, heat generated in the core 71 is efficiently emitted by the heat sink 100. Thus, an increase in the temperature of the planar waveguide 7E is suppressed.

The heat sink 100 may be joined to the first external cladding 74 instead of the second external cladding 75, or may be provided on both the first external cladding 74 and the second external cladding 75.

The planar waveguide 7E has a large beam diameter area compared to a general optical fiber and can suppress a nonlinear phenomenon which is a factor that limits power in an optical fiber. The planar waveguide 7E can amplify the signal light A to obtain higher peak power than peak power that can be achieved by an optical fiber.

The signal light A is allowed to travel into the planar waveguide 7E by the input optics 3 so that the signal light A propagates inside the core 71 in such a manner that an optical path thereof overlaps an optical path of the pumping light B, and in a zig-zag manner in the opposite direction to the pumping light B. The signal light A is reflected inside the planar waveguide 7E a plurality of times and then exits from the planar waveguide 7E. The signal light A having exited from the planar waveguide 7E is outputted to the wavelength filter 5 through the output optics 4 and taken out by the wavelength filter 5.

The pumping light B is allowed to travel into the planar waveguide 7E by the wavelength filter 5 and the output optics 4 so that the pumping light B propagates inside the core 71 in such a manner that an optical path thereof overlaps an optical path of the signal light A, and in a zig-zag manner in the opposite direction to the signal light A. The pumping light B is reflected inside the planar waveguide 7E a plurality of times and then exits from the planar waveguide 7E. Thus, in the planar waveguide amplifier according to the second embodiment, a portion inside the planar waveguide 7E through which the signal light A does not pass is not excited, and energy of the pumping light B can be efficiently used to amplify the signal light A.

As described above, in the planar waveguide amplifier according to the second embodiment, the planar waveguide 7E includes at least either one of the first external cladding 74 that is provided on a face of the first cladding 72 on the opposite side to the core 71 and reflects pumping light B having propagated through the first cladding 72 back to the inside of the core 71 through the first cladding 72, and the second external cladding 75 that is provided on a face of the second cladding 73 on the opposite side to the core 71 and reflects pumping light B having propagated through the second cladding 73 back to the inside of the core 71 through the second cladding 73.

Signal light A propagates in single mode inside the core 71. The pumping light B propagates in multi-mode in a region in which the core 71 is sandwiched between the first cladding 72 and the second cladding 73. Thus, a multi-mode light source such as a laser diode can be used as the pumping light source 6, and a single-mode light source can be used as the signal light source 2.

The planar waveguide amplifier according to the second embodiment includes the heat sink 100 that is provided on either one or both of a face of the first external cladding 74 on the opposite side to the first cladding 72 and a face of the second external cladding 75 on the opposite side to the second cladding 73 to emit heat generated in the core 71. Since the heat in the core 71 is emitted through the heat sink 100, an increase in the temperature of the planar waveguide 7E can be suppressed.

Third Embodiment

Figure 8:
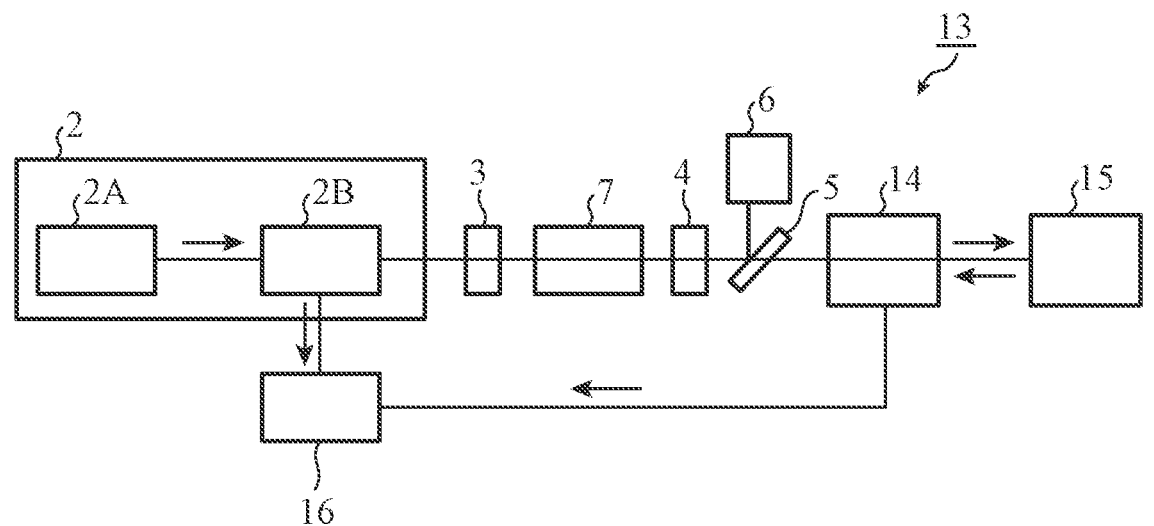
FIG. 8 is a block diagram showing an exemplary configuration of a laser radar device according to a third embodiment.

FIG. 8 is a block diagram showing an exemplary configuration of a laser radar device 13 according to a third embodiment. The laser radar device 13 is, for example, a device that measures the distance to a measurement object and includes, as shown in FIG. 8, a signal light source 2, an input optics 3, an output optics 4, a wavelength filter 5, a pumping light source 6, a planar waveguide 7, a transmission and reception separating and coupling optical system 14, a telescope 15, and a reception detector 16. The signal light source 2 is a pulse light source including a seed laser 2A and a transmission optics 2B.

The seed laser 2A is a laser light source with a narrow linewidth. As the seed laser 2A, for example, a laser diode whose wavelength is stabilized by a fiber Bragg grating (FBG) is used. The transmission optics 2B includes a beam splitter that separates transmission light and local light; a frequency modulator that modulates the transmission light; an acousto-optic modulator (AOM) that modulates continuous light into pulses; and a preamplifier. Note that in a case where a laser radar scheme of the laser radar device 13 is a laser radar scheme that does not require local light, the transmission optics 2B does not need to include the beam splitter. In a case where the AOM has a function of shifting the frequency of transmission light, the AOM also plays the role of a frequency converter.

The signal light source 2, the input optics 3, the output optics 4, the wavelength filter 5, the pumping light source 6, and the planar waveguide 7 shown in FIG. 8 are, for example, the same components as those of the planar waveguide amplifier 1 shown in FIG. 1. Note that the planar waveguide 7 in FIG. 8 may include other elements in FIG. 1 like high reflection films 8 to 10 and antireflection films 11 and 12, and the signal light source 2, the input optics 3, the output optics 4, the wavelength filter 5, and the pumping light source 6 may be components included in the laser radar device 13. In addition, the planar waveguide 7 may be any one of the planar waveguides 7A to 7D shown in FIGS. 3 to 6 or may be the planar waveguide 7E shown in FIG. 7.

The transmission and reception separating and coupling optical system 14 is an optical system that outputs transmission light to the telescope 15 and outputs reception light to the reception detector 16 and includes, for example, a beam expander, a beam splitter, a polarizing beam splitter, and a wave plate. The telescope 15 irradiates atmosphere and a measurement object with the transmission light and captures scattered light which is the transmission light scattered on aerosols in the atmosphere and the measurement object, as reception light.

The reception detector 16 detects the reception light received by the telescope 15 and performs signal processing. For example, in a case where heterodyne measurement is performed, the measurement is performed by allowing the local light separated by the transmission optics 2B to interfere with the reception light, and thus, the reception detector 16 includes a beam splitter and a balanced detector. Many parts of the reception detector 16 and the signal light source 2 are made of fibers, but calibration thereof may be performed in free space.

As one of methods for measuring the distance to a measurement object using a laser radar device, there is a method called Time Of Flight (TOF). In TOF, pulse light is emitted from a laser light source and a portion of the pulse light scattered on a measurement object is received, by which the distance to the measurement object is measured on the basis of a period of time from the emission to reception of the pulse light.

In a case where TOF measurement is performed in the laser radar device 13, internal scattering occurring in the transmission and reception separating and coupling optical system 14 and the telescope 15 is intensely measured. The internal scattering is reflection or scattering of light in a mirror, a lens, a wave plate, or a beam splitter used in the transmission and reception separating and coupling optical system 14 and the telescope 15. Compared to scattered light from aerosols in atmosphere, internal scattered light is very intensely detected.

Since internal scattering in pulses of transmission light is detected at zero distance, i.e., immediately after pulse light is transmitted, the internal scattering can be temporally separated from scattered light to be measured. However, in a case where ASE is mixed in the laser light source, ASE is also present between pulses. Hence, when internal scattering of ASE present between pulses is measured in the same time period as scattered light from aerosols in atmosphere to be originally measured, the S/N ratio significantly deteriorates.

On the other hand, in the planar waveguide 7, since occurrence of ASE is suppressed, a problem resulting from ASE such as that described above does not occur in the laser radar device 13. In addition, signal light A and pumping light B travel into the planar waveguide 7 so that the signal light A and the pumping light B propagate inside the core 71 in such a manner that optical paths thereof overlap each other, and in a zig-zag manner in opposite directions to each other, and propagate inside the core 71 while being reflected inside the core 71 a plurality of times. The signal light A can propagate over a long distance through a portion of the core 71 excited by the pumping light B, by which a high amplification factor for the signal light A is achieved. A similar advantageous effect to this advantageous effect can also be obtained by the planar waveguides 7A to 7E.

The planar waveguide 7 has a large beam area compared to a general optical fiber and can suppress a nonlinear phenomenon which is a factor that limits power in an optical fiber. In addition, the planar waveguide 7 can amplify the signal light A to obtain higher peak power than peak power achieved by an optical fiber. High peak power influences reception strength, by which the S/N ratio improves, enabling long range observation.

As described above, the laser radar device 13 according to the third embodiment includes any one of the planar waveguide amplifiers 1 and 1A to 1D; the signal light source 2 from which signal light A is emitted; and the pumping light source 6 from which pumping light B is emitted. In the planar waveguide amplifiers 1 and 1A to 1D, occurrence of ASE is suppressed, and thus, a high amplification factor and high output peak power can be achieved, and furthermore, the S/N ratio improves, enabling long distance measurement.

Note that a combination of the embodiments, modifications to any component of each of the embodiments, or omissions of any component in each of the embodiments are possible.

INDUSTRIAL APPLICABILITY

Planar waveguide amplifiers according to the present disclosure can be used in, for example, laser radar devices.

REFERENCE SIGNS LIST

1, 1A to 1D: Planar waveguide amplifier, 2: Signal light source, 2A: Seed laser, 2B: Transmission optics, 3: Input optics, 4: Output optics, 5: Wavelength filter, 6: Pumping light source, 7, 7A to 7E: Planar waveguide, 8 to 10: High reflection film, 11, 12: Antireflection film, 13: Laser radar device, 14: Transmission and reception separating and coupling optical system, 15: Telescope, 16: Reception detector, 71: Core, 72: First cladding, 73: Second cladding, 74: First external cladding, 75: Second external cladding, and 100: Heat sink.

The invention claimed is:

1. A planar waveguide amplifier comprising a planar waveguide including:

a flat plate-like core to amplify signal light, with the core excited by pumping light;

a first cladding to reflect light having propagated from the core back to the core, the first cladding being provided on a first principal face of the core; and a second cladding to reflect light having propagated from the core back to the core, the second cladding being provided on a second principal face of the core on an opposite side to the first principal face, wherein the signal light and the pumping light travel into the planar waveguide so that the signal light and the pumping light propagate inside the core in such a manner that optical paths of the signal light and the pumping light overlap each other, wherein a state in which the optical paths of the signal light and the pumping light overlap each other includes a state in which optical axes of the optical paths match each other and a state in which the optical axes are slightly shifted from each other such that a beam cross-section of the signal light and a beam cross-section of the pumping light overlap each other so as to include their optical axes, wherein the signal light and the pumping light travel into the planar waveguide so that the signal light and the pumping light propagate inside the core in directions opposite to each other along a zig-zag path in the plane of the planar waveguide amplifier, so that a portion through which the signal light and the pumping light do not pass is formed inside the core, and the core is an amplification medium that contains a rare-earth element serving as an active ion of a three-level system, and absorbs scattered light of the signal light and amplified spontaneous emission in a portion through which the pumping light does not pass.

2. The planar waveguide amplifier according to claim 1, wherein the planar waveguide includes a reflective film to reflect both the signal light and the pumping light.

3. The planar waveguide amplifier according to claim 1, comprising a heat sink to emit heat generated in the core, the heat sink being provided on at least one of a face of the first cladding on an opposite side to the core and a face of the second cladding on an opposite side to the core.

4. The planar waveguide amplifier according to claim 1, wherein the planar waveguide includes at least either one of a first external cladding to reflect the pumping light having propagated through the first cladding back to an inside of the core through the first cladding and a second external cladding to reflect the pumping light having propagated through the second cladding back to the inside of the core through the second cladding, the first external cladding being provided on a face of the first cladding on an opposite side to the core, and the second external cladding being provided on a face of the second cladding on an opposite side to the core.

5. The planar waveguide amplifier according to claim 4, wherein the planar waveguide includes a reflective film to reflect both the signal light and the pumping light.

6. The planar waveguide amplifier according to claim 4, comprising a heat sink to emit heat generated in the core, the heat sink being provided on at least one of a face of the first external cladding on an opposite side to the first cladding and a face of the second external cladding on an opposite side to the second cladding.

7. A laser radar device comprising:

a planar waveguide amplifier according to claim 1;

a signal light source from which signal light is emitted; and a pumping light source from which pumping light is emitted.

8. A laser radar device comprising:

a planar waveguide amplifier according to claim 2;

a signal light source from which signal light is emitted; and a pumping light source from which pumping light is emitted.

9. A laser radar device comprising:

a planar waveguide amplifier according to claim 3;

a signal light source from which signal light is emitted; and a pumping light source from which pumping light is emitted.

10. A laser radar device comprising:

a planar waveguide amplifier according to claim 4;

a signal light source from which signal light is emitted; and a pumping light source from which pumping light is emitted.

11. A laser radar device comprising:

a planar waveguide amplifier according to claim 5;

a signal light source from which signal light is emitted; and a pumping light source from which pumping light is emitted.

12. A laser radar device comprising:

a planar waveguide amplifier according to claim 6;

a signal light source from which signal light is emitted; and a pumping light source from which pumping light is emitted.

13. The laser radar device according to claim 7, wherein the signal light source is a pulse light source.

14. The laser radar device according to claim 8, wherein the signal light source is a pulse light source.

15. The laser radar device according to claim 9, wherein the signal light source is a pulse light source.

16. The laser radar device according to claim 10, wherein the signal light source is a pulse light source.

17. The laser radar device according to claim 11, wherein the signal light source is a pulse light source.

18. The laser radar device according to claim 12, wherein the signal light source is a pulse light source.

* * * * *